US012442508B2

(12) United States Patent
An

(10) Patent No.: US 12,442,508 B2
(45) Date of Patent: Oct. 14, 2025

(54) LED DEVICE WITH PERFORATED PANEL HAVING LENSES

(71) Applicant: Bitro Group, Inc., Hackensack, NJ (US)

(72) Inventor: Ketak An, Paramus, NJ (US)

(73) Assignee: Bitro Group, Inc., Hackensack, NJ (US)

( * ) Notice: Subject to any disclaimer, the term of this patent is extended or adjusted under 35 U.S.C. 154(b) by 0 days.

(21) Appl. No.: 18/432,815

(22) Filed: Feb. 5, 2024

(65) Prior Publication Data

US 2024/0175563 A1 May 30, 2024

Related U.S. Application Data

(63) Continuation of application No. 17/954,649, filed on Sep. 28, 2022, now Pat. No. 11,927,334, which is a continuation of application No. 17/513,121, filed on Oct. 28, 2021, now Pat. No. 11,530,796.

(60) Provisional application No. 63/107,098, filed on Oct. 29, 2020, provisional application No. 63/107,096, filed on Oct. 29, 2020, provisional application No. 63/107,101, filed on Oct. 29, 2020, provisional application No. 63/107,086, filed on Oct. 29, 2020.

(51) Int. Cl.

| | |
|---|---|
| ***F21V 5/00*** | (2018.01) |
| ***F21V 3/02*** | (2006.01) |
| ***F21V 17/10*** | (2006.01) |
| *F21Y 105/00* | (2016.01) |
| *F21Y 115/10* | (2016.01) |

(52) U.S. Cl.
CPC .............. *F21V 3/02* (2013.01); *F21V 17/101* (2013.01); *F21Y 2105/00* (2013.01); *F21Y 2115/10* (2016.08)

(58) Field of Classification Search
CPC .......... F21V 5/007; F21V 11/14; G09F 13/06; G09F 13/08; G09F 13/0404
See application file for complete search history.

(56) References Cited

U.S. PATENT DOCUMENTS

| | | | | |
|---|---|---|---|---|
| 962,724 | A | 6/1910 | Smith | |
| 1,083,362 | A * | 1/1914 | Grahmann | F21V 5/00 362/456 |
| 1,123,969 | A * | 1/1915 | Wiley | G09F 13/06 40/619 |

(Continued)

OTHER PUBLICATIONS

International search report with written opinion issued by the USPTO for International Patent Application No. PCT/US21/57002, mailed on Mar. 21, 2022.

(Continued)

*Primary Examiner* — Ismael Negron
(74) *Attorney, Agent, or Firm* — Myers Wolin, LLC

(57) ABSTRACT

A light emitting diode (LED) lighting device having a panel forming a shape, the panel having at least one opening. The device further has a frame bounding the panel having a cross-sectional profile in the shape of the panel. A lens corresponds to each of the at least one opening, the lens extending partially through the opening from a back side of the panel to the front side of the panel. The device further includes at least one LED element located behind the lens and a diffuser either between the at least one LED element and the lens or incorporated into the lens.

14 Claims, 9 Drawing Sheets

(56) References Cited

U.S. PATENT DOCUMENTS

| | | | | | |
|---|---|---|---|---|---|
| 1,887,534 | A * | 11/1932 | Wold | G09F 13/04 | 40/579 |
| 3,771,245 | A | 11/1973 | Mabrey et al. | | |
| 4,914,731 | A * | 4/1990 | Chen | G09F 27/008 | 455/24 |
| 5,032,960 | A | 7/1991 | Katoh | | |
| 6,042,243 | A | 3/2000 | Grill et al. | | |
| 6,268,432 | B1 | 7/2001 | Nakata et al. | | |
| 7,307,391 | B2 | 12/2007 | Shan | | |
| 7,494,245 | B2 | 2/2009 | Chang | | |
| 7,607,799 | B2 * | 10/2009 | Ohkawa | G02F 1/133606 | 362/240 |
| 7,637,630 | B2 * | 12/2009 | Wilcox | F21V 5/04 | 362/267 |
| 7,845,829 | B2 * | 12/2010 | Shaner | F21V 25/12 | 362/240 |
| 8,152,333 | B2 * | 4/2012 | Boyer | F21V 7/10 | 362/249.02 |
| 8,313,216 | B2 | 11/2012 | Lai | | |
| 8,446,004 | B2 | 5/2013 | Loh et al. | | |
| 8,545,049 | B2 * | 10/2013 | Davis | F21V 5/04 | 362/249.02 |
| 8,899,786 | B1 * | 12/2014 | Moghal | F21K 9/60 | 362/249.02 |
| 9,404,647 | B2 * | 8/2016 | Duckworth | F21V 5/04 | |
| 9,746,169 | B2 | 8/2017 | Rapp | | |
| 9,857,615 | B2 | 1/2018 | Takase | | |
| 10,247,401 | B2 | 4/2019 | Noh et al. | | |
| 10,330,281 | B2 | 6/2019 | Kang | | |
| 11,067,261 | B2 | 7/2021 | Kim | | |
| 11,118,752 | B2 | 9/2021 | Pruitt et al. | | |
| 2008/0273325 | A1 * | 11/2008 | Wilcox | F21V 5/007 | 362/240 |
| 2009/0091931 | A1 | 4/2009 | Eriksson | | |
| 2009/0323332 | A1 * | 12/2009 | Lo | F21V 5/007 | 362/235 |
| 2011/0069501 | A1 | 3/2011 | Chow | | |
| 2012/0262918 | A1 | 10/2012 | Delhorme et al. | | |
| 2014/0240911 | A1 | 8/2014 | Cole et al. | | |
| 2018/0320885 | A1 | 11/2018 | Musser et al. | | |
| 2021/0242376 | A1 | 8/2021 | Eom | | |

OTHER PUBLICATIONS

Non-final Office Action issue by the USPTO for U.S. Appl. No. 17/954,649, mailed Jul. 19, 2023.

Ex parte Quayle action issued by the USPTO for U.S. Appl. No. 17/513,121, mailed Jun. 7, 2022.

* cited by examiner

LED DEVICE WITH PERFORATED PANEL HAVING LENSES

CROSS-REFERENCE TO RELATED APPLICATION

This application is a continuation of U.S. patent application Ser. No. 17/954,649, filed Sep. 28, 2022, which is a continuation of U.S. patent application Ser. No. 17/513,121, filed Oct. 28, 2021, which claims the benefit of each of U.S. Provisional Patent Application No. 63/107,086, filed Oct. 29, 2020, U.S. Provisional Patent Application No. 63/107,096, filed Oct. 29, 2020, U.S. Provisional Patent Application No. 63/107,098, filed Oct. 29, 2020, and U.S. Provisional Patent Application No. 63/107,101 filed Oct. 29, 2020, the contents of each of which are incorporated by reference herein in its entirety.

FIELD OF THE INVENTION

The invention relates to LED lighting devices, specifically LED and housing configurations for shaped LED displays, such as channel letters, for controlling lighting output.

BACKGROUND

LED signage often includes shaped housing configurations to provide desirable aesthetics for lighting. For example, LED signage may be provided in the shape of letters or a corporate logo. In the case of letters, such signage components are often referred to as channel letters, which provide internal channels for incorporating LED lighting.

Channel letters can be lit in a wide variety of ways. However, in any potential configuration, there are challenges associated with sealing the letters once assembled in a robust way. Channel letter based signage is often installed in outdoor environments, and is exposed to the elements, including moisture and rain, temperature changes, and pressure changes.

Further, because the aesthetic of channel letters is typically based on providing transparent or translucent panels to allow light to pass through selectively, such panels are often provided in combination with opaque panels that are resistant to or impervious to the passage of light. Accordingly, in many configurations, it is important to arrange components so that light cannot leak out of the housing at any location other than transparent or translucent housing panels.

Channel letters may be provided in a wide variety of lighting configurations, including face lit, side lit, and halo lit configurations. In each of these configurations, a housing is required that can consistently control the location of light output from the housing.

Further, because the geometry of the housing of such channel letters is often used to reflect or diffuse light, there are needs for improved housing geometries that can control light in new ways in order to provide improved aesthetics. There is a further need for such improved aesthetics in a housing that can be formed and assembled more easily and consistently than existing housings.

While these challenges are described in the context of channel letters, such challenges also exist in other shaped lighting houses, including in the context of lighting in the shape of corporate logos or in geometric shapes.

SUMMARY

A light emitting diode (LED) lighting device is provided having a panel forming a shape, the panel having at least one opening. The device further has a frame bounding the panel having a cross-sectional profile in the shape of the panel. A lens corresponds to each of the at least one opening, the lens extending partially through the opening from a back side of the panel to the front side of the panel.

The device further includes at least one LED element located behind the lens and a diffuser either between the at least one LED element and the lens or incorporated into the lens.

In some embodiments, the diffuser is a secondary panel mounted behind and spaced apart from the panel, with the diffuser being fixed to and retaining the lens against the at least one opening. In some such embodiments, the at least one LED element is fixed to a back panel, and the diffuser is fixed between the back panel and the panel.

In some embodiments, the at least one opening is a plurality of openings, the plurality of openings located at substantially equal intervals along the panel.

In some embodiments, the lens is substantially semi-spherical, and the at least one opening is smaller than a diameter of the lens.

In some embodiments, the lens is substantially semi-spherical and the lens is further provided with a base larger than a diameter of the lens, and the opening is the same size as or larger than the diameter of the lens, but is smaller than a diameter of the base. In some such embodiments, the diffuser is a secondary panel mounted behind and spaced apart from the panel, and the base has a thickness corresponding to a distance between the panel and the diffuser.

In some embodiments, the at least one LED element is mounted on an inner surface of the frame.

In some embodiments, the frame has a substantially consistent cross-sectional profile.

In some embodiments, the LED lighting device includes a rear panel sized and shaped to correspond to the cross-sectional profile of the frame and spaced apart from the panel and LED element mounted on the rear panel. In some such embodiments, the rear panel further includes a protrusion adjacent to and spaced apart from a boundary of the rear panel. The rear panel is then sized to correspond to an outer surface of the frame and an outer surface of the protrusion is located to correspond to an inner surface of the frame.

In some such embodiments, the protrusion contains fixation holes, and the frame comprises fixation holes at locations corresponding to the fixation holes in the protrusion.

In some embodiments having a rear panel, the frame further includes a protrusion adjacent to and spaced apart from a back edge of the frame, and the rear panel is sized to correspond to an inner surface of the frame, and the protrusion is spaced apart from the back edge of the frame by a thickness of the rear panel.

In some such embodiments, the protrusion contains fixation holes, and the rear panel comprises fixation holes at locations corresponding to the fixation holes in the protrusion.

DETAILED DESCRIPTION OF THE PREFERRED EMBODIMENTS

Figure 1:
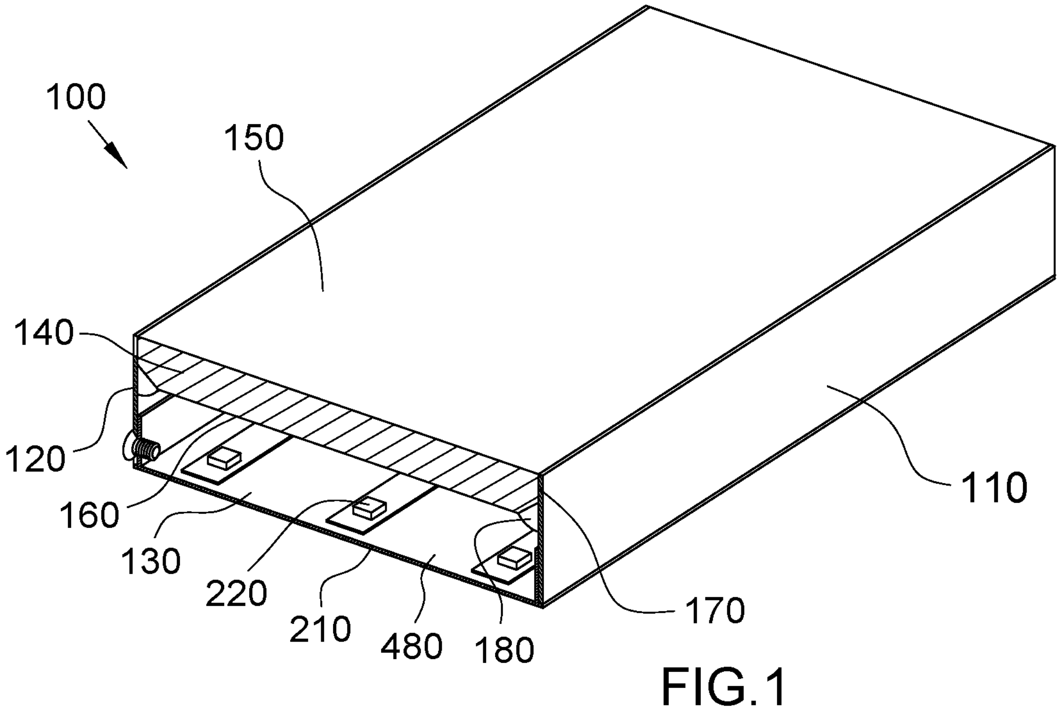
FIG. 1 is a first example of an LED lighting device in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
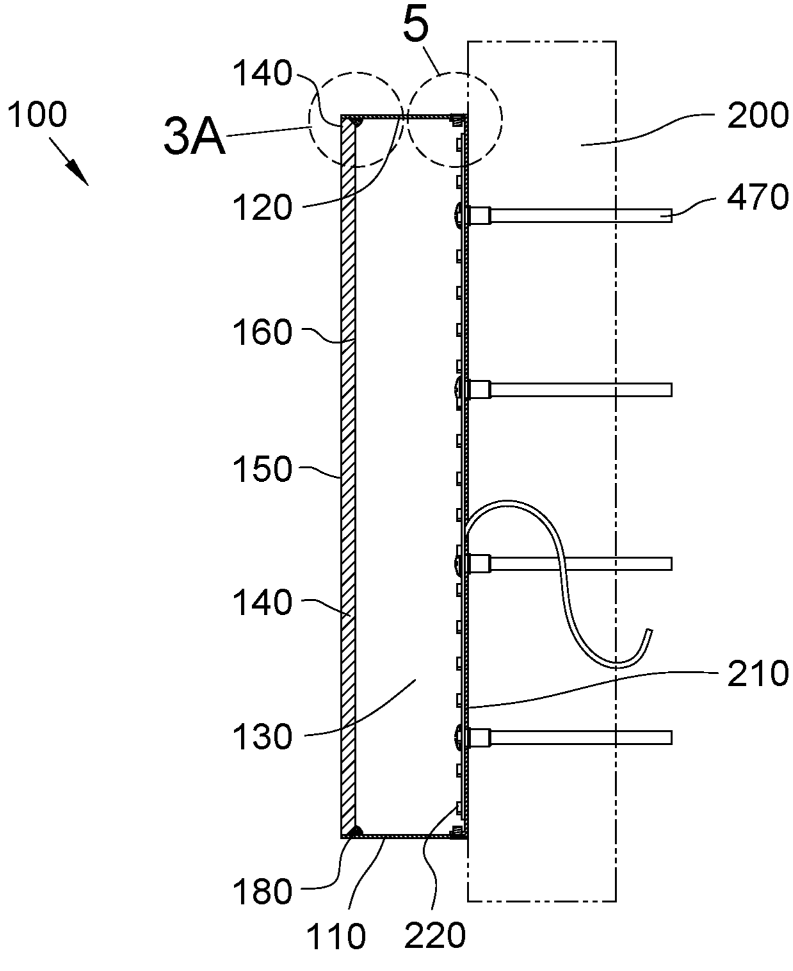
FIG. 2 shows a sectioned view of the LED lighting device of FIG. 1 assembled and mounted.

FIG. 1 is a first example of an LED lighting device 100 in accordance with this disclosure. FIG. 2 shows a sectioned view of the LED lighting device 100 of FIG. 1 assembled and mounted on a wall 200.

As shown, the LED lighting device 100 has a frame 110 that forms a shape. While the figures show the LED lighting device 100 in the shape of a rectangle, the frame 110 is often provided in the shape of a letter, such that the frame is an extrusion forming an outline of the desired letter. The LED lighting device 100 may be one of several such devices in a set, with each device taking the shape of a different letter. Accordingly, several such LED lighting devices 100 can be combined to spell a word, such as a corporate name, in the context of signage. Similarly, the shape of the frame 110 of the LED lighting device may be a shape of a corporate logo.

In any event, the frame 110 may be provided with a consistent cross section, as shown in FIG. 2, taking the form of the shape desired. As such, the frame 110 may be an extrusion of material, or it may be a sheet of material formed into the designed shape. Alternatively, in some embodiments, the cross section of the frame 110 may be enlarged or shrunk over its thickness, such that the cross section consistently takes the desired shape, but in different sizes such that the overall device is tapered.

The frame 110 is provided with an inner surface 120 that surrounds a lighting chamber 130 inside the LED lighting device 100.

The LED lighting device 100 further comprises a front panel 140 that has a front surface 150 sized and shaped to substantially correspond to the inner surface 120 of the frame 110. The front panel 140 has a rear surface 160 having a shape that substantially corresponds to the shape of the front surface 150, but a size smaller than that of the front surface.

The front panel 140 has an edge profile 170 having a depth extending from the front surface 150 to the rear surface 160.

The LED lighting device further comprises an adhesive 180 having a thickness positioned between the edge profile 170 of the front panel 140 adjacent the rear surface 160, and filling a space between the rear surface of the front panel and the inner surface 120 of the frame 110. The adhesive 180 may be, for example, a silicon adhesive 180, or various other adhesives that provide some thickness for filling the space between the rear surface 160 of the front panel 140 and the inner surface 120 of the frame 110.

Figure 3A:
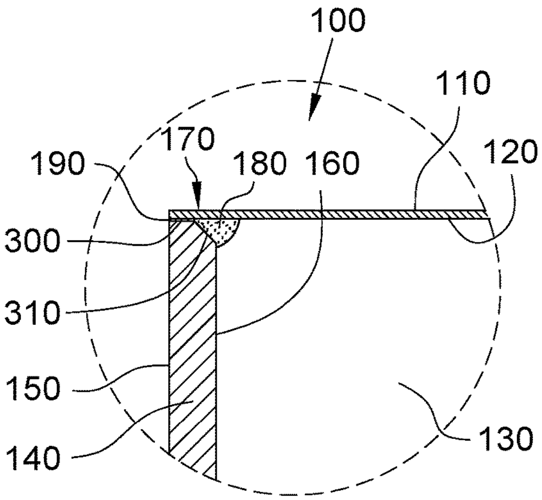
FIG. 3A shows an enlarged view of a feature of the LED lighting device of FIG. 1, labeled 3A.

FIG. 3A shows an enlarged view of a feature of the LED lighting device 100 of FIG. 1, labeled as 3A in FIG. 1. As shown, the edge profile 170 of the front panel 140 may have two distinct portions. A front portion 300 may have a substantially consistent cross-sectional profile that corresponds generally with the size and shape of the inner surface 120 of the frame 110. A distinct back portion 310 of the edge profile 170 may then have a tapered profile, thereby separating from the inner surface 120 of the frame 110. As shown, the front portion 300 of the edge profile 170 is typically adjacent the front surface 150 while the back portion 310 is typically adjacent the rear surface 160. As shown in FIG. 3A, the tapered back portion 310 may taper consistently, such that the back portion itself has a flat tapered finish.

As noted above, an adhesive 180 have a thickness, such as a silicon adhesive, is applied between the rear surface 160 of the front panel 140 and the inner surface 120 of the frame 110. In some embodiments, a secondary adhesive 190 is provided to fix the front portion 300 of the edge profile 170 to the inner surface 120 of the frame 110 while the adhesive 180 fills the space between the back portion 310 and the frame 110.

Figure 3B:
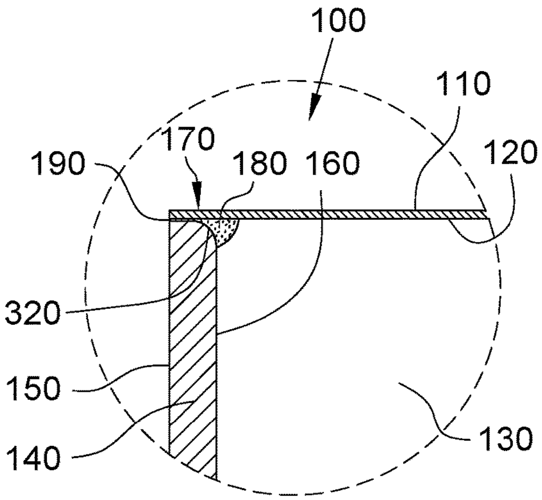
FIGS. 3B-3F show enlarged views of features implemented instead of or in combination with the feature of FIG. 3A in alternative embodiments of the LED lighting device of FIG. 1.
Figure 3C:
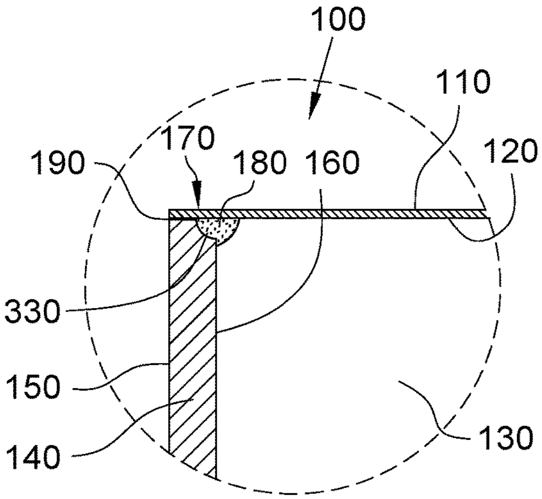
Figure 3D:
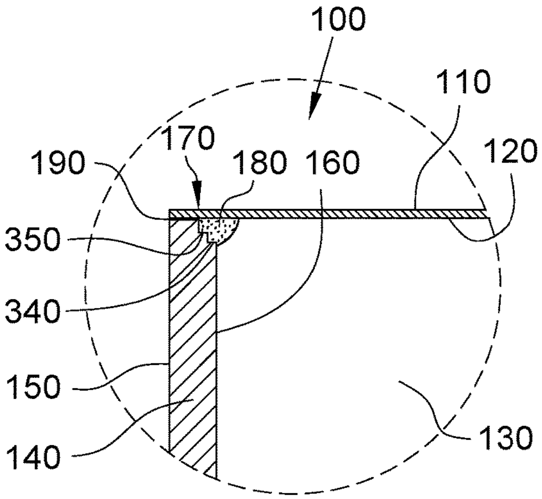

While the embodiment of FIGS. 1 and 3A show a front panel 140 having the edge profile described, alternative edge profiles are contemplated as well. FIGS. 3B-3D show enlarged views of some such alternative edge profiles 170. As shown, each potential edge profile 170 has a front portion 300 adjacent the front surface 150 that has a substantially consistent cross-sectional profile, as in the embodiment of FIG. 3A. However, in the embodiment of FIG. 3B, a back portion 320 of the edge profile 170 is provided having a convex curvature. Alternatively, as shown in FIG. 3C, the back portion 330 may be provided with a concave curvature.

As shown in FIG. 3D, in some embodiments, a back portion 340 of the edge profile 170 has a substantially consistent cross-sectional profile that is smaller than the cross-sectional profile of the front portion 300. As such, the back portion 340 is spaced apart from the inner surface 120 of the frame 110. In such an embodiment, an additional intermediate portion 350 may be provided as well. Such an intermediate portion may also have an internally consistent cross-section such that it forms a step between the front portion 300 and the back portion 340. Alternatively, in some embodiments, the intermediate portion 350 may be provided with a distinct geometry such that it is sloped or otherwise links the profile of the front portion 300 to the profile of the back portion 340.

In any event, the provision of the shapes shown in FIGS. 3A-D reinforce bonding between the inner surface 120 of the frame 110 forming a channel for the LED lighting device 100 taking the form of the channel letter shown and the front panel 140 forming the face of the channel letter.

As shown in FIGS. 1 and 2, the LED lighting device 100 further comprises a rear panel 210 sized and shaped to correspond to the frame 110 and spaced apart from the front panel 140 by a thickness of the frame. Together, the frame 110, the front panel 140, and the rear panel 210 define lighting chamber 130. At least one LED lighting element 220 is provided inside the lighting chamber 130, and may be mounted on the rear panel 210. As shown, the at least one LED lighting element 220 may be multiple lighting elements, or multiple strips of lighting elements arranged within the lighting chamber 130.

In the embodiment shown, the LED lighting elements 220 are mounted on the rear panel 210 and are directed forwards towards the front panel 140. The front panel 140 may be translucent or transparent, such that light can pass through. The front panel 140 may have a thickness formed from a translucent material that acts as a diffuser, such that light diffuses across the thickness of the front panel, and individual LED lighting elements 220 cannot be identified when viewed from a front side of the front panel.

In contrast, the frame 110 may be formed from material that is opaque or impervious to light. For example, the frame 110 may be formed from aluminum or another metal, while the front panel 140 is formed from a plastic compound, such as an acrylic polymer, having desired light characteristics. As such, light may pass through the front panel 130, but is not admitted through the side wall. The rear panel 210 may similarly be formed from an opaque material or a material that is impervious to light, such as metal. Alternatively, the frame 110 and rear panel 210 may be formed from various materials and painted such that light does not pass through it.

Where the front panel 140 is formed from acrylic, the panel may be formed having a consistent cross section and then the shapes shown in FIGS. 3A-D may be routed out. Because of the combination of a translucent or transparent front panel 140 with a frame 110 that is impervious to light, the LED lighting device 100 provides only front lighting without side lighting. As such, the front panel 140 should remain firmly fixed to the frame 110 and the connections between the front panel 140 and the frame as well as the connection between the rear panel 210 and the frame 110 should be configured such that light does not leak out of the lighting chamber 130 other than through the front panel 140.

Figure 3E:
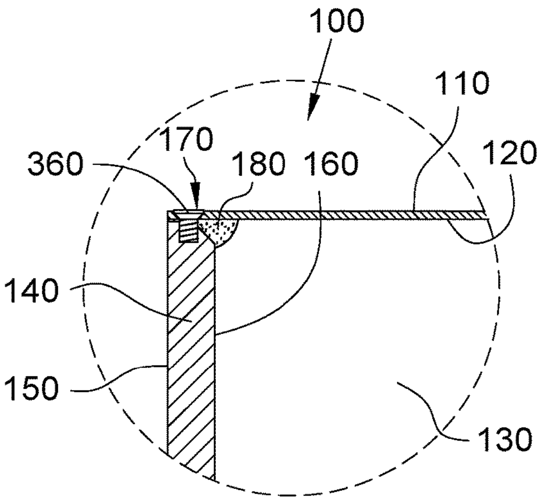
Figure 3F:
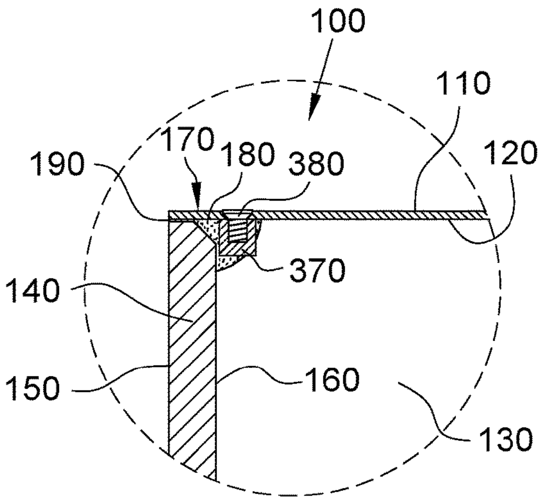

FIGS. 3E-F show features implemented instead of or in combination with the features of FIGS. 3A-D in alternative embodiments of the LED lighting device of FIG. 1. As shown in FIG. 3E, a fixation element, such as a screw 360, may be provided to further enhance a bond between the front panel 140 and the frame 110. Accordingly, the screw 360 may be provided in addition to the adhesive 180 and, in some embodiments, the secondary adhesive 190. This additional fixation element may be provided in the context of any of the edge profile designs discussed above.

Alternatively, as shown in FIG. 3F, an additional fixation block 370 may be provided. This fixation block 370 may be one of several such blocks, and may be formed from the same material as the front panel 140 in order to provide additional support. The adhesive 180 may then surround the fixation bock 370, as shown, and a fixation element, such as a screw 380 may be provided, such that a more stable fixation is generated between the front panel 140 and the frame 110.

Figure 4:
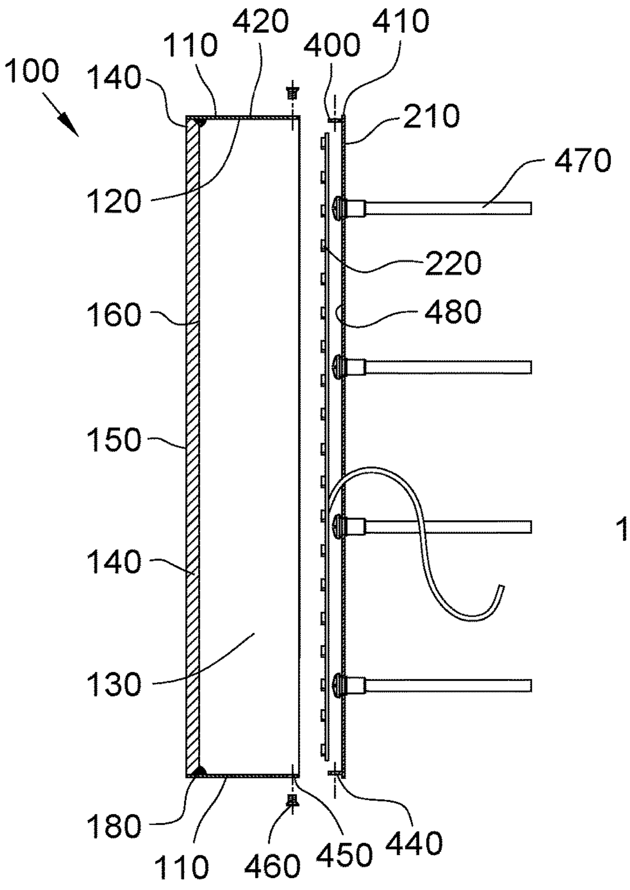
FIG. 4 shows a partially exploded view of the LED lighting device of FIG. 1.
Figure 5:
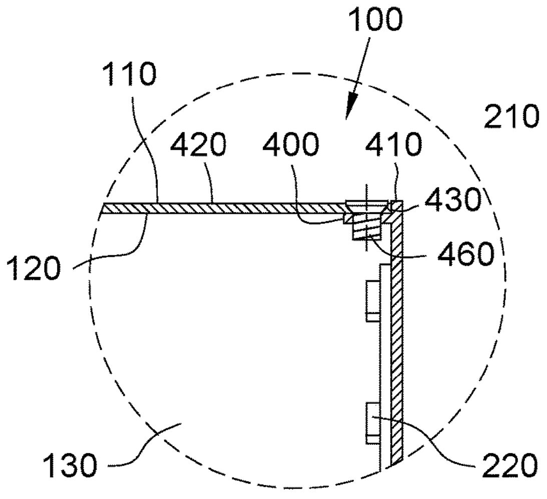
FIG. 5 shows an enlarged view of a feature of the LED lighting device of FIG. 1.

FIG. 4 shows a partially exploded view of the LED lighting device 100 of FIG. 1. FIG. 5 shows an enlarged view of a feature of the LED lighting device 100 of FIG. 1. As shown, a rear panel 210 is provided, and is sized and shaped to correspond to the size and shape of the frame 110. The rear panel 210 has a protrusion 400 adjacent to and spaced apart from a boundary 410 of the rear panel 210. As such, the rear panel 210 as a whole is sized to correspond to the size of an outer surface 420 of the frame 110, while an outer surface of the protrusion 400 is located to correspond to the inner surface 120 of the frame 110.

As such, a boundary area 430 of the rear panel 210 may be sized to correspond to a thickness of the frame 110, and the outer boundary 410 of the rear panel may then be flush with the frame.

The protrusion 400 may be provided with fixation holes 440 and the frame 110 may be provided with fixation holes 450 at corresponding locations, such that fixation elements, such as a screws 460 may fix the rear panel 210 to the frame 110 by way of the protrusion 400.

As shown, the LED lighting device 100 may be mounted on a wall 200 by way of a plurality of fixation elements 470 configured to be anchored into or pass through the wall. Such fixation elements 470 may be configured such that they are applied from an inside surface 480 of the rear panel 210, and at regular intervals. In the embodiment shown, the rear panel 210 may then be fixed to the wall 200, and then the frame 110 and the front panel 140 may be applied thereto using the screws 460. In this way, the screws 460 may be accessible from the side of the LED lighting device 100, and the lighting chamber 130 may be accessed for service by removing the screws 460 and opening the LED lighting device 100.

Figure 6:
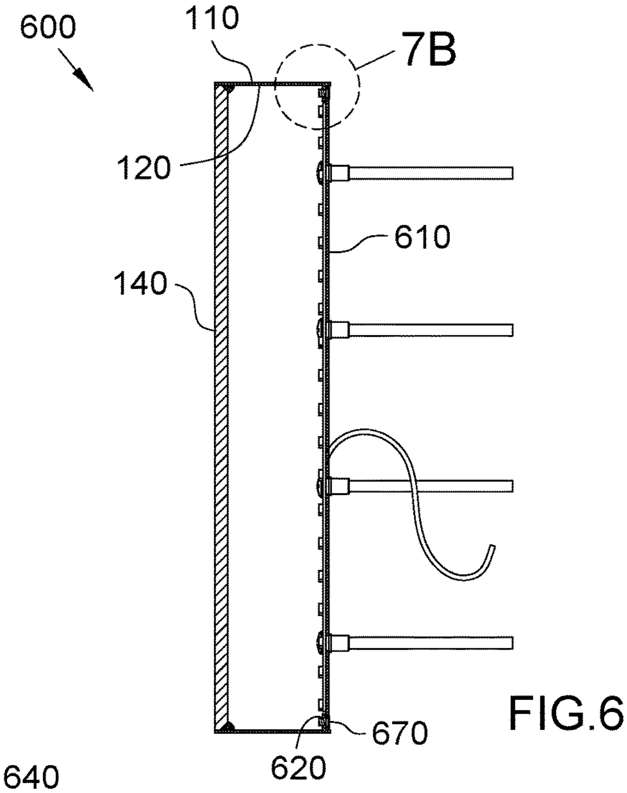
FIG. 6 shows an alternative embodiment of the LED lighting device of FIG. 1.
Figure 7A:
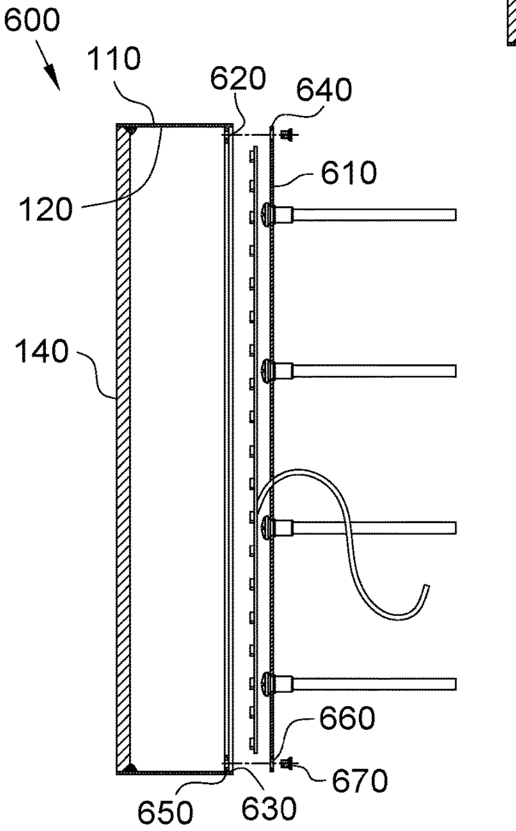
FIG. 7A shows an exploded view of the embodiment of FIG. 6.
Figure 7B:
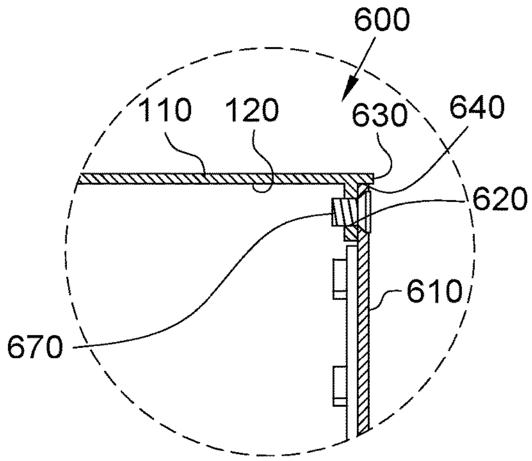
FIG. 7B shows an enlarged view of a feature of the embodiment of FIG. 6, labeled 7B.

FIG. 6 shows an alternative embodiment 600 of the LED lighting device 100 of FIG. 1. FIG. 7A shows an exploded view of the embodiment 600 of FIG. 6. FIG. 7B shows an enlarged view of a feature of the embodiment 600 of FIG. 6, labeled 7B in FIG. 6.

The alternative embodiment 600 is similar to the LED lighting device 100 of FIG. 1, and similar reference numbers are applied thereto, except with respect to the fixation of a rear panel 610 to the device 100 and a corresponding protrusion 620 applied to the interior surface 120 of the frame 110. As shown, the frame 110 comprises a protrusion 620 extending from the inner surface 120 adjacent to and spaced apart from a back end 630 of the frame. The protrusion 620 is typically spaced apart from the back end 630 by a thickness of the rear panel 610.

The rear panel 610 is then sized such that an outer boundary 640 of the panel is sized and shaped to correspond with the inner surface 120 of the frame 110. As such, when the rear panel 610 is applied to the frame 110 in order to enclose the lighting chamber 130, the rear panel is flush with the frame and supported by the protrusion.

The protrusion may then include screw holes 650 and the rear panel 610 may contain corresponding screw holes 660 which are then used to secure the rear panel to the frame 110 using a screw 670.

Figure 8:
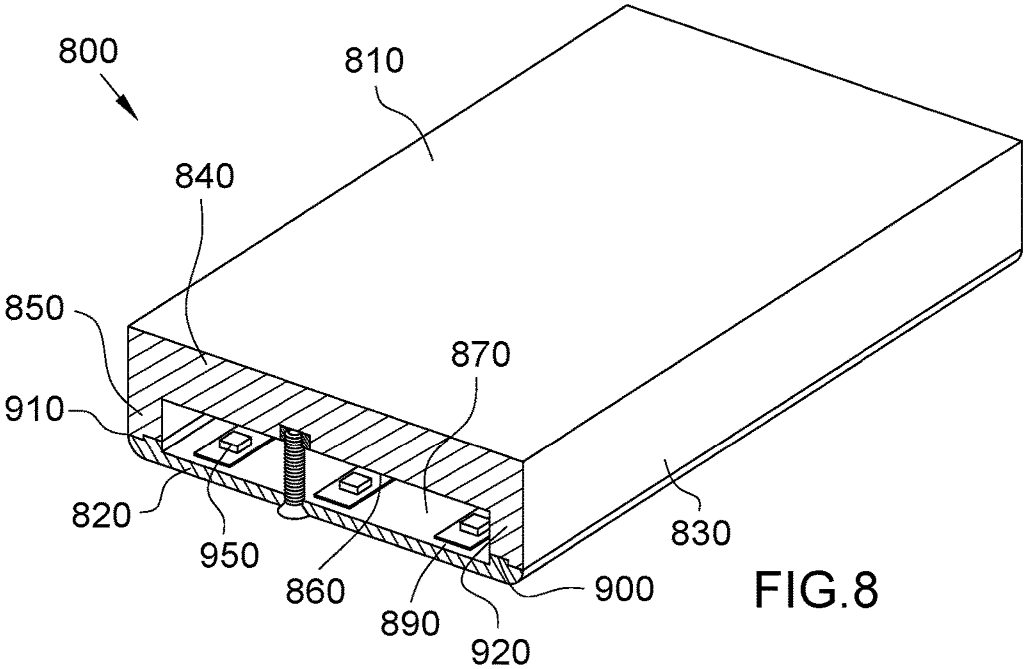
FIG. 8 shows a second example of an LED lighting device in accordance with this disclosure.
Figure 9:
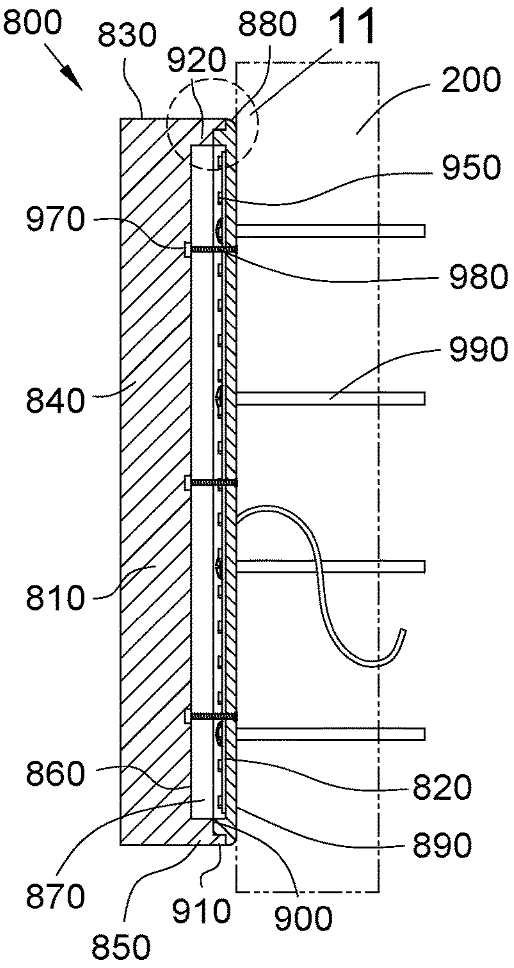
FIG. 9 shows a sectioned view of the LED lighting device of FIG. 8 assembled and mounted.
Figure 10:
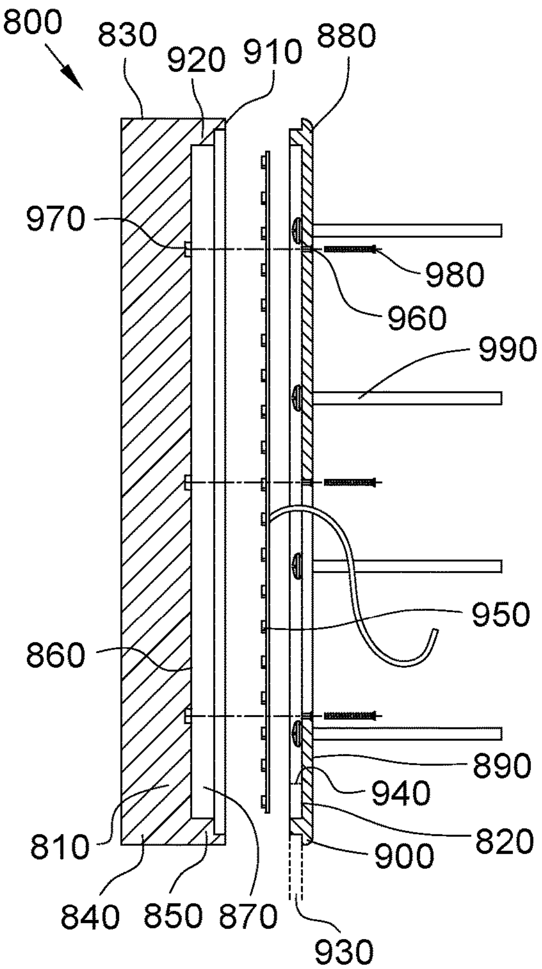
FIG. 10 shows a partially exploded view of the LED lighting device of FIG. 8.
Figure 11:
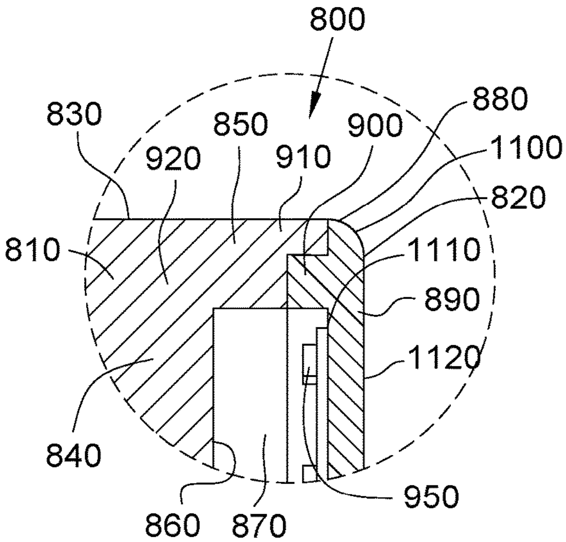
FIG. 11 shows an enlarged view of a feature of the embodiment of FIG. 8, labeled 11.

FIG. 8 shows a second example of an LED lighting device 800 in accordance with this disclosure. FIG. 9 shows a sectioned view of the LED lighting device 800 of FIG. 8 assembled and mounted on a wall 200. FIG. 10 shows a partially exploded view of the LED lighting device 800 of FIG. 8. FIG. 11 shows an enlarged view of a feature of the embodiment 800 of FIG. 8, labeled 11 in FIG. 8.

As shown, the LED lighting device 800 comprises a front housing 810 and a rear housing 820. The front housing 810 is generally formed from a translucent or transparent material, such as acrylic. Where the front housing is formed from acrylic, or similar materials, it may be initially formed as a block and then routed out to form the geometry described. The rear housing 820 is generally opaque or impervious to light, and may be formed from an appropriate material for blocking light, such as aluminum or other metals. Alternatively, the rear housing 820 may be formed from various materials and painted such that light is not admitted through the rear housing.

The front housing 810 has an outer profile 830 and an overall shape formed from the translucent or transparent material. As discussed above, the overall shape may be a letter, for example, and the outer profile may form an outline of the letter. The front housing may then comprise a front housing body 840 and an edge protrusion 850 extending from a back surface 860 of the front housing body 840. The edge protrusion 850 may define the outer profile 830, and may bound an inner light chamber 870.

The rear housing 820 may have a size and outer profile 880 substantially corresponding to the shape of the front housing 810, and may comprise a substantially planar rear panel 890 and a rear panel protrusion 900 extending from the rear panel adjacent to and spaced apart from an outer edge of the rear housing which defines the outer profile 880. The rear panel 890 and the rear panel protrusion 900 then combine with the front housing body 840 and the edge protrusion 850 to bound the inner light chamber 870.

The combination of the transparent or translucent front housing 810 described and the opaque rear housing 820 provides an LED lighting device 800 that allows light to exit through the front and side of the assembly. In order to allow for even lighting, the translucent body 840 of the front housing 810 is typically provided with a thickness such that the material of the body can diffuse light. The geometry of the edge protrusion, described in more detail below, allows for further diffusion of light passing through the side of the assembly 800.

As shown, at least a portion 910 of the edge protrusion 850 surrounds the rear panel protrusion 900. The edge protrusion 850 may thereby comprise an inner protrusion 920 having a first thickness and an outer protrusion 910, which is the portion of the edge protrusion that surrounds the rear panel protrusion 900, having a second thickness larger than the first thickness. The difference between the first thickness of the inner protrusion 920 and the second thickness of the outer protrusion 910 may then correspond to a thickness of the rear panel protrusion 900. This combination of geometries allows for a precise fit that minimizes light leakage.

The rear panel protrusion 900 has an outer thickness 930 and an inner thickness 940. In some embodiments, as shown in FIG. 8, the outer thickness is smaller than the inner thickness. In such a scenario, the difference between the first thickness of the inner protrusion 920 and the second thickness of the outer protrusion 910 of the edge protrusion 850 corresponds to the outer thickness 930 of the rear panel protrusion 900. As shown, the larger size of the inner thickness 940 results in a larger inner light chamber 870.

As shown, at least one LED element 950 is mounted on the rear panel 890 within the inner light chamber 870. In embodiments where the inner thickness 940 is larger than the outer thickness 930 of the rear panel protrusion 900, the LED element may be spaced further from the front housing body 840 by virtue of the larger inner light chamber 870. In this way, the inner light chamber 870 may be configured to provide additional room for LED installation when the inner thickness of 940 is insufficient.

As shown, the rear panel 890 may have at least one fixation hole 960 spaced apart from the rear panel protrusion 900. The front housing body 840 may then be provided with a fixation retainer 970 opposite the at least one fixation hole. In some embodiments, the fixation retainer 970 may be formed from a material different than the front housing body 840. Accordingly, the fixation retainer 970 may be a metal nut for receiving a screw 980, where the nut is embedded in the translucent or transparent material, which may be, for example, acrylic.

As shown, the LED lighting device 800 shown may be mounted on a wall 200 by way of a plurality of posts 990.

The outer profile 880 of the rear body 820 may form the boundary of the rear panel 890, and may have an edge profile

1100 having a thickness extending from a front surface 1110 of the rear panel to a back surface 1120 of the rear panel. As shown, the edge profile 1100 may not be perpendicular to the front surface 1110 or the back surface 1120. As shown in FIG. 11, the edge profile may be rounded.

Figure 12:
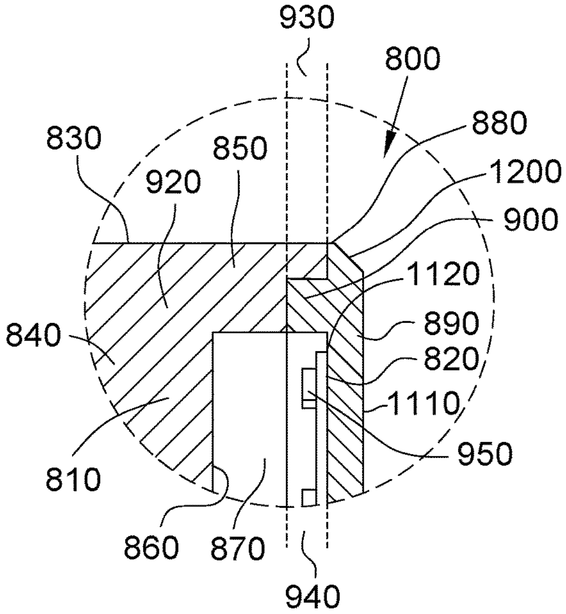
FIG. 12 shows an enlarged view of an alternative feature that could be incorporated into the embodiment of FIG. 8.

FIG. 12 shows an enlarged view of an alternative feature that could be incorporated into the embodiment 800 of FIG. 8. In contrast with the rounded edge profile 1100 of FIG. 11, FIG. 12 shows a similar structure but with a beveled edge profile 1200. In both FIGS. 11 and 12, the edge profile 1100, 1200 is configured such that at the extreme outer edge of the outer profile 880 of the rear body 820, the LED lighting device 800 is spaced apart from the wall 200 on which it is mounted. In this way, the edge profile 1100, 1200 provides a floating effect for the corresponding device 800.

Figure 13:
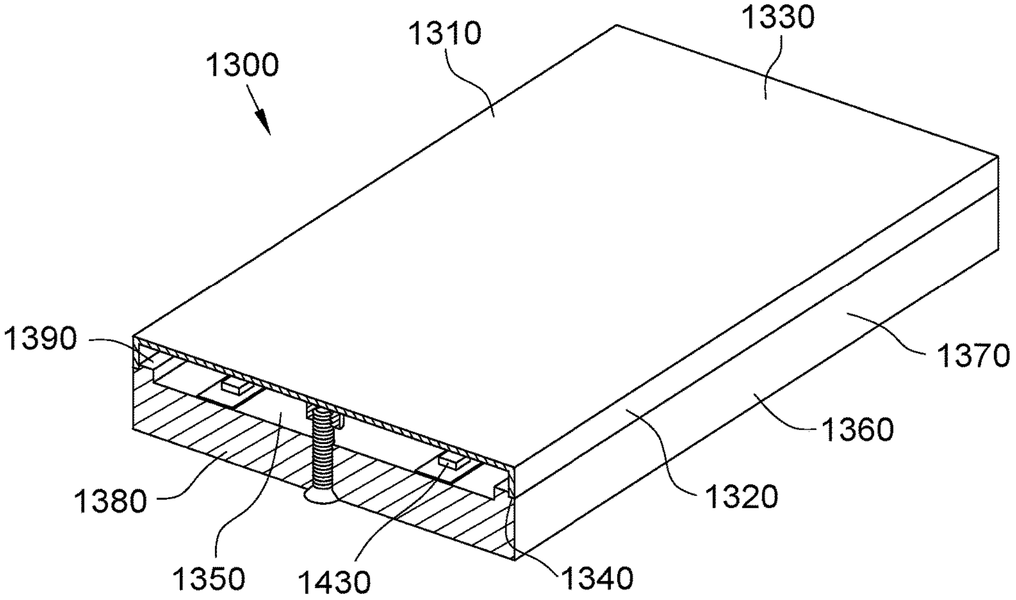
FIG. 13 shows a third example of an LED lighting device in accordance with this disclosure.
Figure 14:
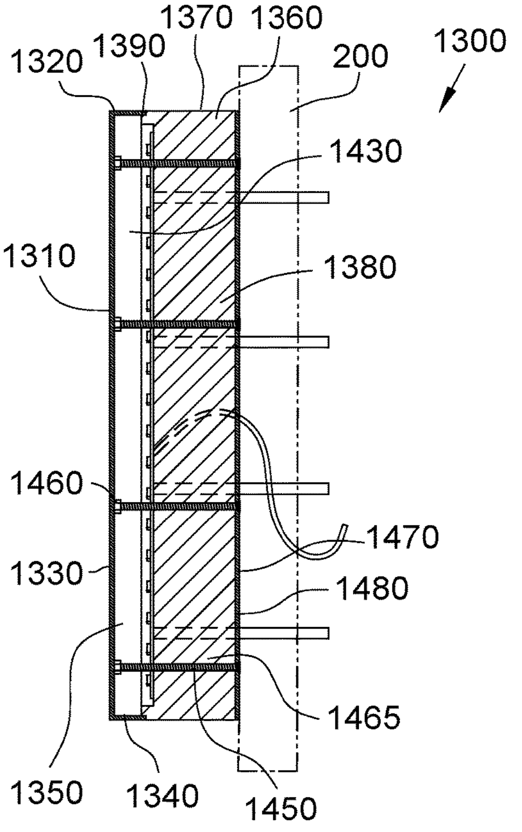
FIG. 14 shows a sectioned view of the LED lighting device of FIG. 13 assembled and mounted.
Figure 15:
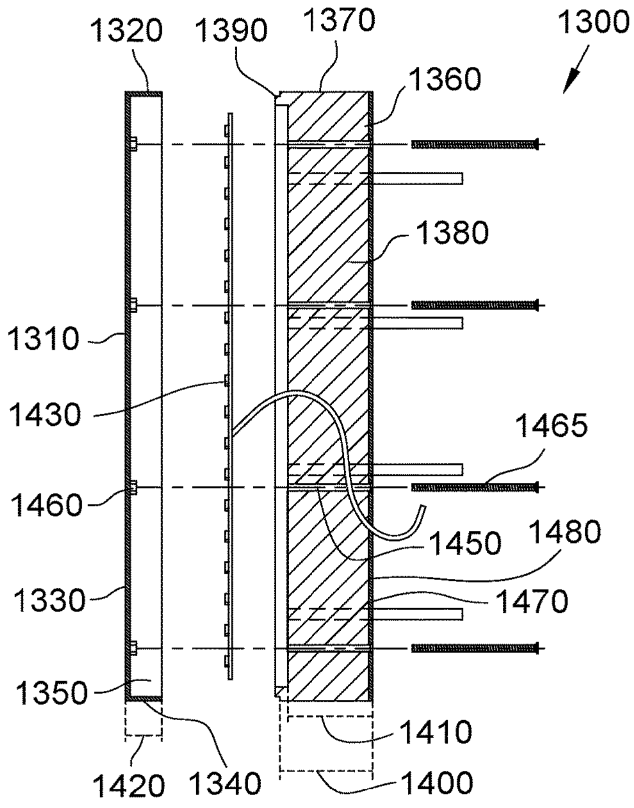
FIG. 15 shows a partially exploded view of the LED lighting device of FIG. 13.

FIG. 13 shows a third example of an LED lighting device 1300 in accordance with this disclosure. FIG. 14 shows a sectioned view of the LED lighting device 1300 of FIG. 13 assembled and mounted. FIG. 15 shows a partially exploded view of the LED lighting device 1300 of FIG. 13.

As shown, the LED lighting device 1300 comprises a front housing 1310 having an outer profile 1320 and shape, the front housing being opaque or impervious to light. The front housing 1310 may therefore be formed, for example, from a metal material, or may be painted to render it impervious to light. The front housing 1310 comprises a front panel 1330 and a front panel protrusion 1340 extending from the front panel along the outer profile 1320 such that the front panel protrusion bounds an inner light chamber 1350.

The LED lighting device 1300 further comprises a rear housing 1360 having an outer profile 1370 substantially corresponding to the size and shape of the front housing 1310. The rear housing 1360 comprises a rear housing body 1380 and a rear housing protrusion 1390, such that the rear panel housing and the rear housing protrusion combine with the front housing 1310 to bound the inner light chamber 1350. In order to provide lighting, at least one LED element 1430 is mounted within the inner light chamber 1350.

As shown, the rear housing 1360 has an outer edge thickness 1400 outside the area bounded by the rear housing protrusion 1390 and an inner chamber thickness 1410 within the area bounded by the rear housing protrusion. The inner chamber thickness 1410 is smaller than the outer edge thickness 1400. The front panel protrusion 1340 then encompasses and encloses the rear housing protrusion 1390 and has a thickness 1420 greater than the difference between a thickness of the rear housing protrusion 1390 and the outer edge thickness 1400.

In the embodiment shown, the rear housing 1360 is formed from a translucent or transparent material, such as acrylic. The combination of the translucent or transparent rear housing 1360 with a front housing 1210 that is impervious to light provides an LED lighting device 1300 in which light exits through the side of the housing but not the front. This results in a halo effect.

In order to create such an effect, any light exiting the housing should be diffused such that the light exiting the inner light chamber 1350 is relatively even. Accordingly, the rear housing body 1380 of the rear housing 1360 is relatively thick, such that the rear housing body 1380 can serve as a diffuser. Further, if the at least one LED element 1430 is mounted on the rear housing body 1380, light will first bounce off a back surface of the front panel 1330 and then return to diffuse through the rear housing body 1380. In order to even out the light, there is an advantage to increasing a distance between the rear housing body 1380 and the front panel 1330, to allow for increased spreading of light leaving the LED element 1430.

By providing an inner chamber thickness 1410 smaller than the outer edge thickness 1400, this allows for a larger inner light chamber 1350 while also minimizing the thickness 1420 of the front panel protrusion 1340. Minimizing the thickness 1420 of the front panel protrusion 1340 provides aesthetic benefits, as it allows for light to exit a larger thickness of the sides of the shape formed by the rear housing 1360. Accordingly, as shown, the rear housing 1360 has an outer edge depth from a lateral end of the rear housing protrusion 1390 to an outer edge surface outside the area bounded by the rear housing protrusion, and an inner chamber depth from the lateral end of the rear housing protrusion 1390 to an inner chamber surface within the area bounded by the rear housing protrusion, where the inner chamber depth is larger than the outer edge depth.

As shown, the LED lighting device 1300 may be provided with at least one fixation hole 1450 passing through the rear housing body 1380 and spaced apart from the rear housing protrusion 1390. The front housing 1310 may then be provided with a fixation retainer 1460 fixed to an inner surface of the front panel 1330 opposite the at least one fixation hole 1450, and a fixation element, such as a screw 1465 may pass through the fixation hole 1450 to be retained by the fixation retainer 1460.

The LED lighting device 1300 may be further provided with mounting posts 1470 which can be used to mount the device to a wall 200.

As further shown, the LED lighting device 1300 may be provided with a laminating material 1470 located on a back surface 1480 of the rear housing body 1380. The laminating material 1470 may be opaque, or impervious to light, and may be provided in a light color. For example, the laminating material 1470 may be an opaque white vinyl sheet. The laminating material 1470 may provide a consistent surface from which light diffusing through the rear housing body 1380 can reflect, thereby improving the consistency of light exiting the side of the rear housing 1360. A light reflective surface on the laminating material 1370 can also increase the light output returned through the sides of the rear housing 1360.

Figure 16:
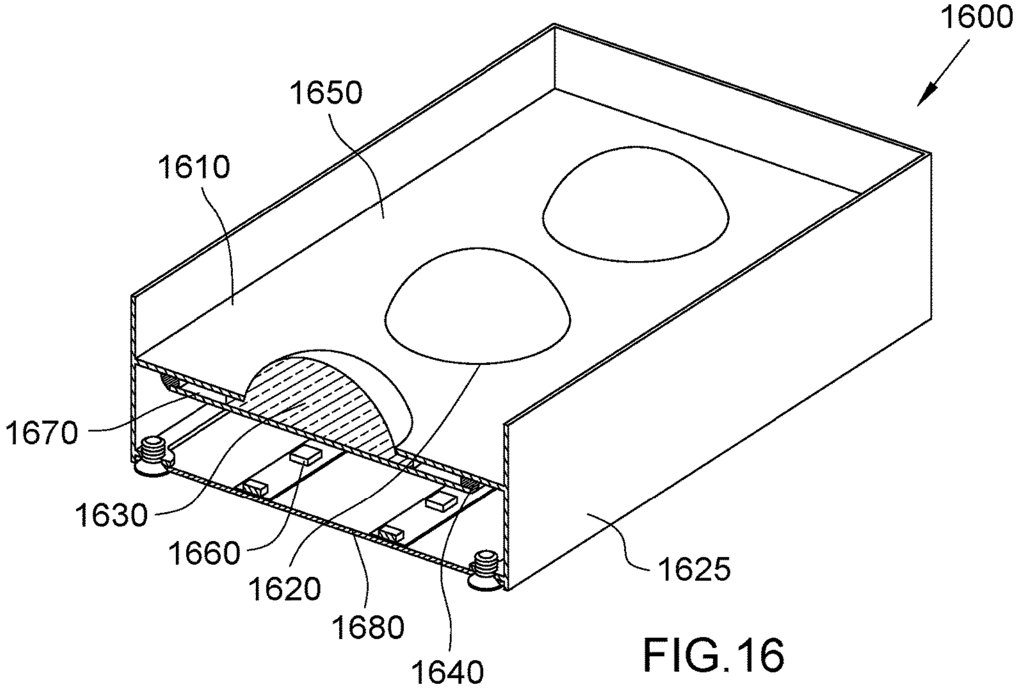
FIG. 16 shows a fourth example of an LED lighting device in accordance with this disclosure.
Figure 17:
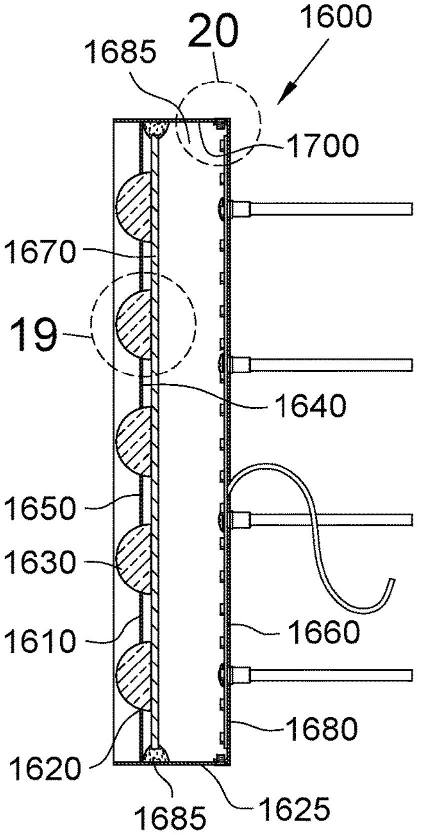
FIG. 17 shows a sectioned view of the LED lighting device of FIG. 16.
Figure 18:
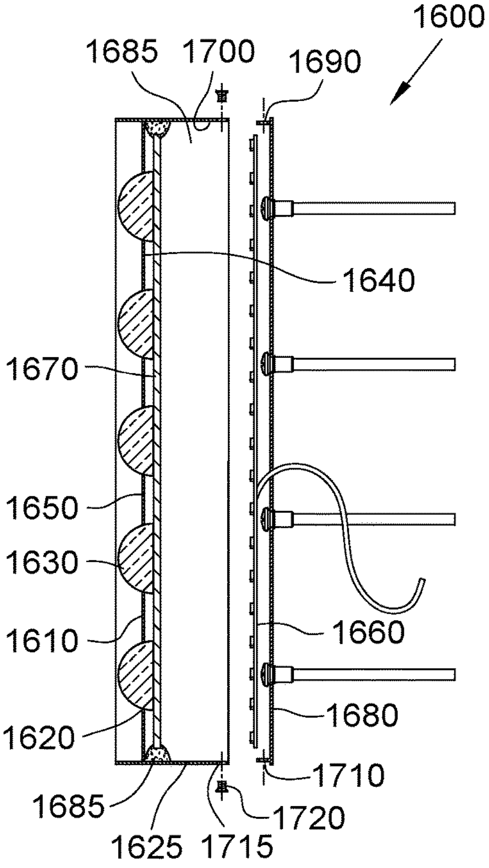
FIG. 18 shows a partially exploded view of the LED lighting device of FIG. 16.
Figure 19:
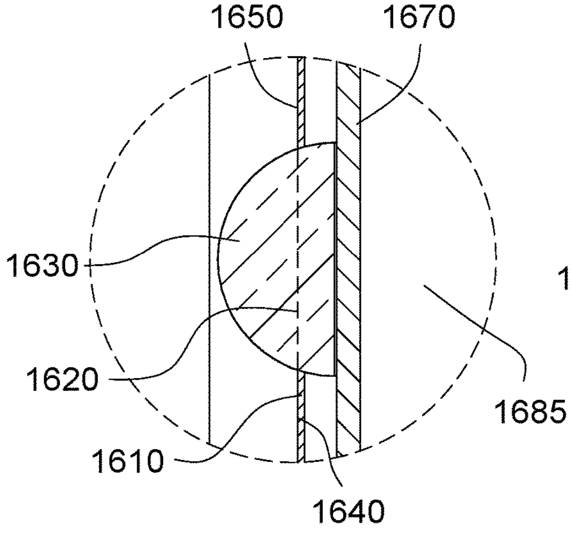
FIG. 19 shows an enlarged view of a portion of the LED lighting device of FIG. 16, labeled 19.
Figure 20:
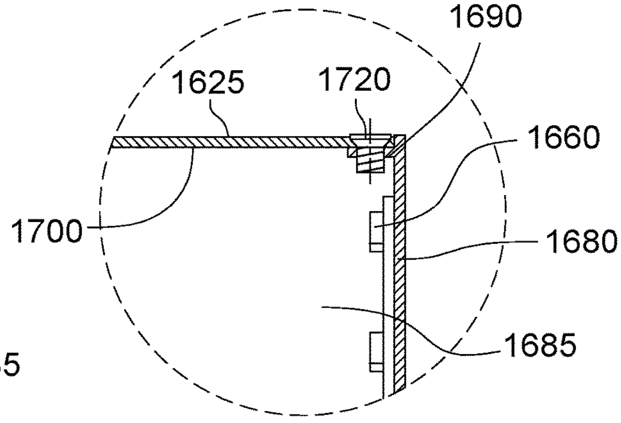
FIG. 20 shows an enlarged view of a portion of the LED lighting device of FIG. 16, labeled 20.

FIG. 16 shows a fourth example of an LED lighting device 1600 in accordance with this disclosure. FIG. 17 shows a sectioned view of the LED lighting device 1600 of FIG. 16. FIG. 18 shows a partially exploded view of the LED lighting device 1600 of FIG. 16. FIG. 19 shows an enlarged view of a portion of the LED lighting device 1600 of FIG. 16, labeled 19 in FIG. 17. FIG. 20 shows an enlarged view of a portion of the LED lighting device 1600 of FIG. 16, labeled 20 in FIG. 17.

As shown, the LED lighting device 1600 comprises a panel 1610 forming a shape, the panel having at least one opening 1620. A frame 1625 is provided bounding the panel 1610, with the frame having a cross-sectional profile in the shape of the panel.

A lens 1630 is provided corresponding to each opening 1620 in the panel 1610, with the lens extending at least partially through the opening from a back side 1640 of the panel to a front side 1650. At least one LED element 1660 is then located behind the lens 1630, and a diffuser 1670 is provided either between the LED element 1660 and the lens 1630 or incorporated into the lens itself.

In the embodiment shown, the diffuser 1670 is a secondary diffuser panel mounted behind and spaced apart from the panel 1610. The diffuser 1670 may then be fixed to the lens 1630, and may retain the lens against the opening 1620. The diffuser panel 1670 may then be positioned by fixing it to the frame 1625 and thereby spacing it apart from the panel 1610. It may be fixed by way of an adhesive 1685, for example.

As shown, the at least one LED element 1660 may be several LED elements mounted on a back panel 1680 of the LED lighting device 1600. Accordingly, the diffuser 1670 is located between the LED element 1660 and the lens 1630, such that any light leaving the LED element first passes through the diffuser 1670 and the lens 1630 prior to escaping an internal light chamber 1685 of the LED lighting device.

As shown, the at least one opening 1620 may be a plurality of openings arrayed across the panel 1610. Such openings 1620 may be evenly spaced and located at substantially equal intervals along the panel 1610, and each opening may be provided with a corresponding lens 1630. In this way, signage formed from the LED lighting device 1600 shown may emulate marquee lettering formed from individual light bulbs using LED elements. In some alternative embodiments, the openings 1620 may be located irregularly, or may be located randomly.

As shown in FIGS. 17-19, the lens 1630 in the embodiment 1600 shown is substantially semispherical, and the opening 1620 is smaller than a diameter of the lens. As such, the lens 1630 may be pressed through the opening 1630 by the diffuser 1670, but would not pass fully through the opening. While the embodiment shown provides a typical configuration, the size of the lens 1630 may vary across various embodiments.

The LED elements 1660 in the embodiment shown are mounted on a back panel 1680 of the LED lighting device 1600. As shown, the back panel 1680 is sized and shaped to correspond to the cross-sectional profile of the frame 1625, and is spaced apart from the panel 1610. In such embodiments, as shown, the frame 1625 may have a substantially consistent cross-sectional profile.

In some alternative embodiments, the LED elements 1660 may instead be mounted on an inner surface 700 of the frame 1620. In some such embodiments, no rear panel may be provided, such that the back of the LED lighting device 1600 is open.

Where a back panel 1680 is provided, it may be provided with a back panel protrusion 1690 sized to correspond to a size and shape of an inner surface 1700 of the frame 1625. The configuration and features of such a protrusion 1690 in the context of the back panel 1680 is similar to that discussed above with respect to the back panel protrusion 400 of FIGS. 4 and 5 in the context of the LED lighting device 100 of FIGS. 1-5.

Accordingly, the rear panel is sized to correspond to an outer surface of the frame 1625 and an outer surface of the protrusion 1690 is located to correspond to the inner surface 1700 of the frame 1625. The protrusion 1690 may then contain fixation holes 1710 and the frame 1625 may be provided with fixation holes 1715 at locations corresponding to the fixation holes in the protrusion, such that the LED lighting device 1600 may be closed using a fixation element, such as a screw 1720.

Figure 21:
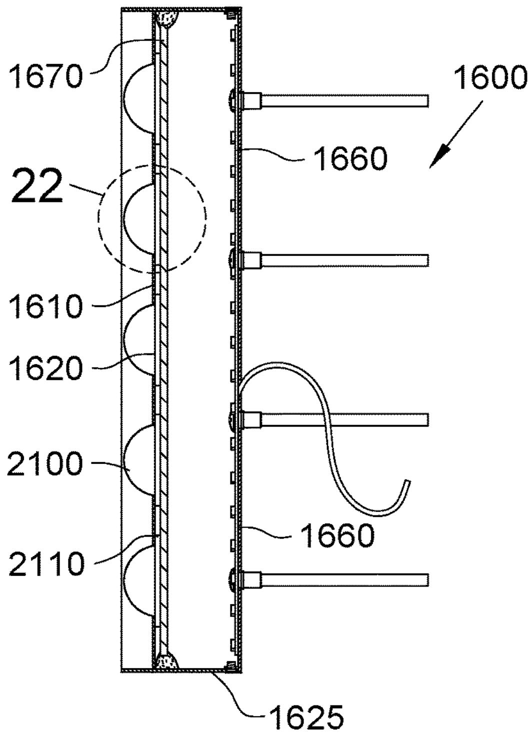
FIG. 21 shows an alternative embodiment of the LED lighting device of FIG. 16.
Figure 22:
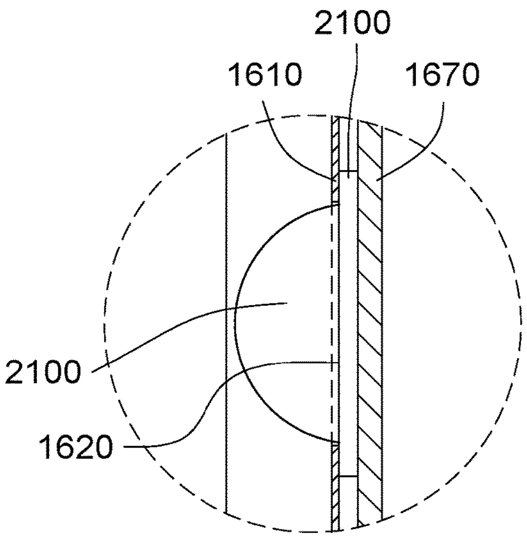
FIG. 22 shows an enlarged view of a portion of the LED lighting device of FIG. 21 labeled 22.

FIG. 21 shows an alternative embodiment of the LED lighting device 1600 of FIG. 16. FIG. 22 shows an enlarged view of a portion of the LED lighting device 1600 of FIG. 21, labeled 22 in FIG. 21. The embodiment shown is similar to that shown in FIGS. 17-19, and the same reference numbers are used to refer to identical elements. However, as shown, the lens 2100 provided in FIG. 21 differs from that provided in FIG. 17. As shown, the lens 2100 is substantially semispherical but is further provided with a base 2110 larger than the diameter of the lens. In such an embodiment, the opening 1620 in the panel 1610 is larger than or substantially equal to a diameter of the lens 2100, but smaller than a diameter of the base 2110 of the lens.

In the embodiment shown, the diffuser 1670 may be a secondary panel mounted behind and spaced apart from the panel 1610. The base 2110 of the lens 2100 may then have a thickness corresponding to a distance between the panel 1610 and the diffuser 1670.

Figure 23:
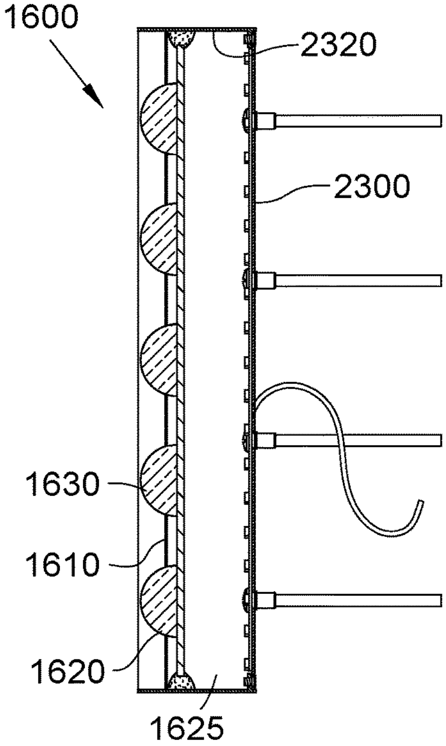
FIG. 23 shows an alternative embodiment of the LED lighting device of FIG. 16.
Figure 24:
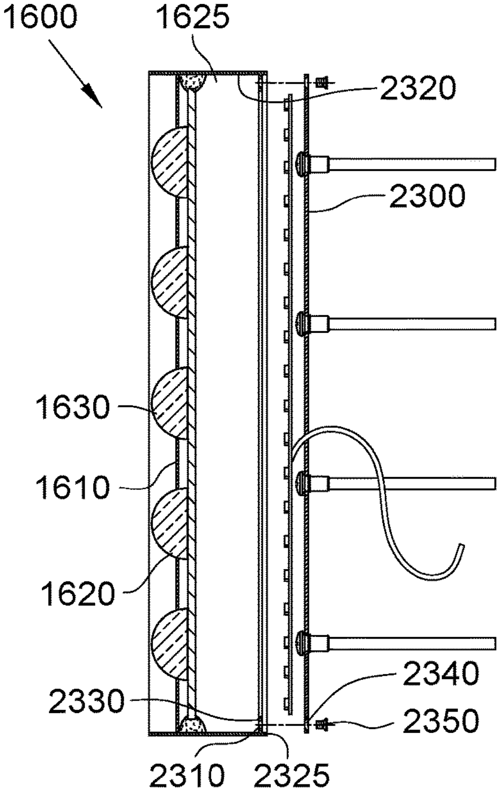
FIG. 24 shows an exploded view of the embodiment of FIG. 23.

FIG. 23 shows an alternative embodiment of the LED lighting device 1600 of FIG. 16. FIG. 24 shows an exploded view of the embodiment 1600 of FIG. 23. The embodiment shown is generally similar to that discussed above with respect to FIG. 16 and differs only in the application of a rear panel 2300 to a frame 1625 of the LED lighting device 1600. As shown, the frame 1625 is provided with a frame protrusion 2310 which is spaced apart from a lateral end of the frame cross section. The rear panel 2300 is then sized to generally correspond to a size and shape of an inner surface 2320 of the frame 1625. The configuration is thereby similar to that discussed above with respect to protrusion 620 in FIGS. 6, 7A, and 7B.

As such, the protrusion 2310 may be spaced apart from the lateral end of the frame 1625 cross section by a thickness of the rear panel 2300, such that when the rear panel rests on the protrusion 2310, the outer surface of the rear panel lies flush with the lateral end of the frame 2325. Further, as shown, the protrusion 2310 may contain fixation holes 2330 and the rear panel 2300 may comprise fixation holes 2340 at locations corresponding to those in the protrusion. Such fixation holes may allow the LED lighting device 1600 to be close using a fixation element, such as a screw 2350.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A light emitting diode (LED) lighting device comprising:
- a front panel forming a shape, the front panel having at least one opening;
- a frame bounding the panel having a cross-sectional profile in the shape of the front panel;
- a lens corresponding to each of the at least one opening, the lens extending partially through the opening from a back side of the front panel to the front side of the front panel;
- at least one LED element located behind the lens;
- a diffuser either between the at least one LED element and the lens, or incorporated into a back surface of the lens or the lens as a whole;
- a back panel; and
- an undivided space between the back panel and the front panel,
- wherein the at least one LED element is fixed to the back panel, and wherein the at least one opening is a plurality of openings such that a single LED element of the at least one LED element illuminates at least two openings of the plurality of openings.

2. The device of claim 1, wherein the at least one opening is a plurality of openings, the plurality of openings located at substantially equal intervals along the front panel.

3. The device of claim 1, wherein the lens is substantially semispherical, and wherein the at least one opening is smaller than a diameter of the lens.

4. The device of claim 1, wherein the at least one LED element is mounted on an inner surface of the frame.

5. The device of claim 1, wherein the frame has a substantially consistent cross-sectional profile.

6. The device of claim 1 further comprising a rear panel sized and shaped to correspond to the cross-sectional profile of the frame and spaced apart from the front panel wherein the at least one LED element is mounted on the rear panel.

7. The device of claim 1, wherein the diffuser is a secondary panel mounted behind and spaced apart from the front panel, the diffuser being fixed to and retaining the lens against the at least one opening.

8. The device of claim 7 further comprising a back panel, wherein the at least one LED element is fixed to the back panel, and wherein the diffuser is fixed between the back panel and the front panel.

9. The device of claim 1, wherein the lens is substantially semispherical and wherein the lens is further provided with a base larger than a diameter of the lens, and wherein the opening is the same size as or larger than the diameter of the lens, but is smaller than a diameter of the base.

10. The device of claim 9, wherein the diffuser is a secondary panel mounted behind and spaced apart from the front panel, and wherein the base has a thickness corresponding to a distance between the front panel and the diffuser.

11. A light emitting diode (LED) lighting device comprising:

a front panel forming a shape, the front panel having at least one opening;

a frame bounding the front panel having a cross-sectional profile in the shape of the front panel;

a lens corresponding to each of the at least one opening, the lens extending partially through the opening from a back side of the front panel to a front side of the panel;

at least one LED element located behind the lens;

a diffuser either between the at least one LED element and the lens or incorporated into the lens; and a rear panel sized and shaped to correspond to the cross-sectional profile of the frame and spaced apart from the front panel wherein the at least one LED element is mounted on the rear panel, wherein the rear panel further comprises a protrusion adjacent to and spaced apart from a boundary of the rear panel, wherein the rear panel is sized to correspond to an outer surface of the frame and an outer surface of the protrusion is located to correspond to an inner surface of the frame.

12. The device of claim 11, wherein the protrusion contains fixation holes, and wherein the frame comprises fixation holes at locations corresponding to the fixation holes in the protrusion.

13. A light emitting diode (LED) lighting device comprising:

a front panel forming a shape, the front panel having at least one opening;

a frame bounding the front panel having a cross-sectional profile in the shape of the front panel;

a lens corresponding to each of the at least one opening, the lens extending partially through the opening from a back side of the front panel to a front side of the panel;

at least one LED element located behind the lens;

a diffuser either between the at least one LED element and the lens or incorporated into the lens; and a rear panel sized and shaped to correspond to the cross-sectional profile of the frame and spaced apart from the front panel wherein the at least one LED element is mounted on the rear panel, wherein the frame further comprises a protrusion adjacent to and spaced apart from a back edge of the frame, and wherein the rear panel is sized to correspond to an inner surface of the frame, and wherein the protrusion is spaced apart from the back edge of the frame by a thickness of the rear panel.

14. The device of claim 13, wherein the protrusion contains fixation holes, and wherein the rear panel comprises fixation holes at locations corresponding to the fixation holes in the protrusion.

* * * * *